US005301259A

United States Patent [19]

Gibson et al.

[11] Patent Number: 5,301,259

[45] **Date of Patent: * Apr. 5, 1994**

[54] METHOD AND APPARATUS FOR GENERATING VOCAL HARMONIES

[75] Inventors: Brian C. Gibson; John P. Bertsch, both of Victoria, Canada

[73] Assignee: IVL Technologies Ltd., Victoria, Canada

[*] Notice: The portion of the term of this patent subsequent to Jul. 27, 2010 has been disclaimed.

[21] Appl. No.: 34,526

[22] Filed: Mar. 22, 1993

Related U.S. Application Data

[63] Continuation of Ser. No. 719,195, Jun. 21, 1991.

[51] Int. Cl.[5] .......... G01L 9/10

[52] U.S. Cl. .......... 395/2.67; 395/2; 395/2.79; 395/2.87; 381/49; 84/625; 84/660

[58] Field of Search .......... 395/2, 2.67, 2.79, 2.87; 381/49; 84/625, 660

[56] References Cited

U.S. PATENT DOCUMENTS

| | | | |
|---|---|---|---|
| 3,539,701 | 11/1970 | Milde | 84/1.28 |
| 3,986,423 | 10/1976 | Rossum | 84/1.01 |
| 3,999,456 | 12/1976 | Tsunoo et al. | 84/1.01 |
| 4,076,960 | 2/1978 | Buss et al. | 179/1 SA |
| 4,081,607 | 3/1978 | Vitols et al. | 179/1 SB |
| 4,142,066 | 2/1979 | Ahamed | 179/1 P |
| 4,279,185 | 7/1981 | Alonso | 84/1.01 |
| 4,464,784 | 8/1984 | Agnello | 381/61 |
| 4,596,032 | 6/1986 | Sakurai | 381/51 |
| 4,688,464 | 8/1987 | Gibson et al. | 84/454 |
| 4,771,671 | 9/1988 | Hoff, Jr. | 84/1.01 |
| 4,915,001 | 4/1990 | Dillard | 84/600 |
| 5,231,671 | 7/1993 | Gibson et al. | 395/2 |

FOREIGN PATENT DOCUMENTS

| | | |
|---|---|---|
| WO90/03640 | 4/1990 | PCT Int'l Appl. . |
| 2094053A | 9/1982 | United Kingdom . |

OTHER PUBLICATIONS

Lent, K., "An Efficient Method for Pitch Shifting Digitally Sampled Sounds," *Computer Music Journal,* vol. 13, No. 4, Winter 1989.

International Search Report.

*Primary Examiner*—Michael R. Fleming
*Assistant Examiner*—Tariq Hafiz
*Attorney, Agent, or Firm*—Christensen, O'Connor, Johnson & Kindness

[57] ABSTRACT

Disclosed are a method and apparatus for analyzing an input vocal signal to produce a plurality of harmony signals that are combined with the input vocal signal to produce a multivoice signal. The method makes a current estimate of the fundamental frequency of the input vocal signal and determines if the current estimate is the correct estimate of the fundamental frequency. If the current estimate is correct, a reference note is assigned to correspond to the current estimate and a plurality of harmony notes are selected to correspond to the reference note. The method then generates a plurality of harmony signals by scaling the input vocal signal with a piecewise linear approximation of a Hanning window to extract a portion of the input vocal signal and by replicating the extracted portion at a plurality of rates equal to the fundamental frequencies of each of the harmony notes. The plurality of harmony signals and the input vocal signal are combined to produce the multivoice signal. The steps of the method are carried out with a microprocessor and a signal processing circuit.

12 Claims, 9 Drawing Sheets

METHOD AND APPARATUS FOR GENERATING VOCAL HARMONIES

This is a continuation of the prior application Ser. No. 07/719,195, filed on Jun. 21, 1991, of Brian C. Gibson and John Paul Bertsch for METHOD AND APPARATUS FOR GENERATING VOCAL HARMONIES, the benefit of the filing date of which is hereby claimed under 35 U.S.C. § 120.

FIELD OF THE INVENTION

The present invention relates generally to an apparatus and method for generating musical harmonies and, in particular, to an apparatus and method for generating vocal harmonies.

BACKGROUND OF THE INVENTION

Musical harmony generators are machines that operate to produce a set of harmony signals that correspond to a given musical input signal. With such a machine, a musician can play a melody line while the machine generates the harmony lines, thereby allowing one musician to sound like several. Harmony generators that work with signals from musical instruments, such as guitars or synthesizers, have been well known for many years. Such devices generally operate by sampling an input signal and shifting its frequency to generate the harmonies.

In a periodic musical signal, there is always a fundamental frequency that determines the particular pitch of the signal as well as numerous harmonies, which provide character to the musical signal. It is the particular combination of the harmonic frequencies with the fundamental frequency that make, for example, a guitar and a violin playing the same note sound different from one another. In a musical instrument such as a guitar, flute, saxophone, or a keyboard, as the pitch of a note varies, the spectral envelope of the fundamental frequency and the harmonics expand or contract as the pitch is shifted up or down. Therefore, for musical instruments one can create harmony notes by sampling sound from the instrument and playing the sampled sound back at a rate either faster or slower, without the harmony notes sounding artificial. Although this method of generating harmonies works for musical instruments, it does not work well for generating vocal harmonies.

In a vocal signal, there is typically a fundamental frequency that determines the pitch of a note an individual is singing, as well as a set of harmonic frequencies that add character and timbre to the note. In contrast with a musical instrument, as the pitch of a vocal signal varies, the spectral envelope of the harmonics retains the same shape but the individual frequencies that make up the spectral envelope may change in magnitude. Therefore, generating harmony signals for the voice, by sampling a note as it is sung and varying its frequency, does not sound natural, because that method varies the shape of the spectral envelope. In order to generate harmony notes for a vocal signal, a method is required for varying the frequency of the fundamental, while maintaining the overall shape of the spectral envelope.

The inventors have found that the method, as set forth in the article, Lent, K., "An Efficient Method for Pitch Shifting Digitally Sampled Sounds," *Computer Music Journal*, Volume 13, No. 4, Winter, pp. 65–71 (1989) (hereafter referred to as the Lent method) is particularly suited for use in generating vocal harmonies because the method maintains the shape of the spectral envelope. However, the actual implementation of the Lent method, as set forth in the referenced paper, is computationally complex and difficult to implement in real time with inexpensive computing equipment. Additionally, the Lent method requires that the fundamental frequency of a signal be known exactly. However, a problem with generating harmony signals for a voice, is the fact that vocal signals are difficult to analyze and the Lent method does not address the problem of accurately determining the fundamental frequency of a complex vocal signal in the presence of noise. For instance, the fundamental frequency of a given note when sung may vary considerably, making it difficult for a harmony generator to determine the fundamental frequency and generate the proper harmony notes.

Therefore, the method used to generate vocal harmonic notes by shifting the pitch of a digitally sampled vocal signal should operate substantially in real time and use inexpensive computing equipment. This technique should thus provide a method of accurately analyzing an input vocal signal in order to generate a multipart vocal signal.

SUMMARY OF THE INVENTION

The present invention comprises a method and apparatus for analyzing an input vocal signal representative of a musical note in order to produce a plurality of harmony signals that are combined with the input vocal signal to produce a multivoice signal. The method comprises the steps of reiteratively determining a current estimate of the fundamental frequency of the input signal and testing the current estimate based on a set of parameters derived from a previous estimate of the fundamental frequency. A reference note is assigned to correspond to the current estimate, if the current estimate is the correct estimate. A plurality of harmony notes based on the reference note are selected and a plurality of harmony signals are generated to correspond to the plurality of harmony notes. The input vocal signal is combined with the plurality of harmony signals to produce the multivoice signal. In the preferred embodiment, the plurality of harmony signals are produced by scaling the input vocal signal by a piecewise linear approximation of a Hanning window to extract a portion of the input vocal signal and then replicating the extracted portion at a plurality of rates substantially equal to the fundamental frequencies of each of the harmony signals.

DETAILED DESCRIPTION OF THE DRAWINGS

Figure 1:
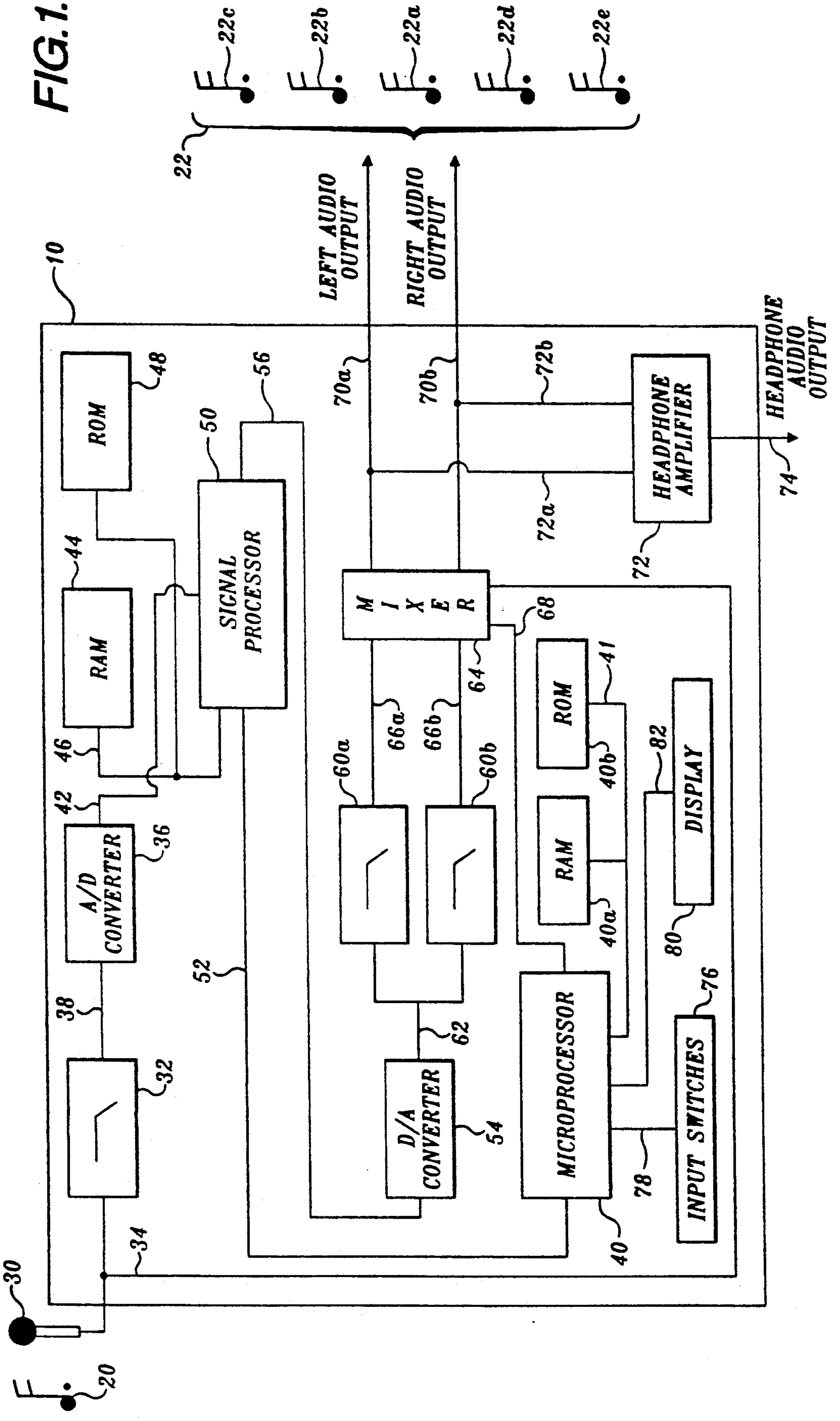
FIG. 1 is a block diagram of a vocal harmony generator according to the present invention.

FIG. 1 is a block diagram of a vocal harmony generator 10 according to the present invention. The vocal harmony generator 10 receives an input vocal signal 20 and generates a multivoice output signal 22, which comprises an output signal 22*a* that sounds at substantially the same pitch as the input vocal signal 20, and up to four harmony notes 22*b*, 22*c*, 22*d*, and 22*e* having pitches that are harmonically related to the input vocal signal 20. The vocal harmony generator 10 receives the input vocal signal 20 through a microphone 30 or from another source, such as a tape recorder, which produces a corresponding electrical signal that is passed to an input filter block 32 over a lead 34. Filter block 32 preferably comprises an anti aliasing filter that reduces the amount of high-frequency noise picked up by the microphone 30. After being filtered by the filter block 32, the input vocal signal 20 is converted from an analog-to-digital format by an analog-to-digital (A/D) converter 36, which is coupled to filter block 32 by a lead 38.

The A/D converter 36 is coupled to a signal-processing block 50 by a lead 42 over which the digital signals representative of input vocal signal 20 are conveyed. The signal-processing block 50 stores the digital input signals in a circular array within a random access memory (RAM) 44, which is coupled to the signal-processing block 50 by a lead 46. Also coupled to lead 46 is a read-only memory (ROM) 48. Signal-processing block 50 generates a multivoice signal, including the harmony signals by extracting a portion of the input vocal signal 20 that is stored in RAM 44 and replicating the extracted portion at a plurality of rates substantially equal to the fundamental frequencies of each of the harmony signals, as will be described below. A lead 52 couples the signal-processing block 50 to a microprocessor 40 so that the microprocessor can supply a set of parameters used by the signal-processing block 50 to generate the harmony signals. Microprocessor 40 preferably is an eight-bit architecture-type chip, Model No. 80C31 made by Intel Corporation. Coupled to the microprocessor 40 by a lead 41 are an external random-access memory (RAM) 40*a* and an external read-only memory (ROM) 40*b*.

The output of the signal processor block 50 is coupled to a digital-to-analog (D/A) converter 54 by a lead 56, which converts the harmony signals from a digital format to an analog format. An output signal of the D/A converter 54 is coupled to a pair of reconstruction filters 60*a*, 60*b* by leads 62. These output filters remove any high-frequency noise that may have been added to the harmony signals by the signal-processing block 50. A mixer 64 receives the analog multivoice signal from output filters 60*a* and 60*b* over a pair of leads 66*a* and 66*b*, as well as the input vocal signal on lead 34. Mixer 64 is coupled to microprocessor 40 by a lead 68 and controls the balance of the multivoice signal between a left audio output 70*a* and a right audio output 70*b*, as well as the balance of the input vocal signal to the harmony signals. A headphone amplifier 72 is coupled to the output of mixer 64 to provide a headphone audio output signal on a lead 74.

Also included within vocal harmony generator 10 is a set of input switches 76, which allows a musician operating the harmony generator 10 to adjust its operation. The input switches 76 are coupled to microprocessor 40 by a lead 78. A display unit 80 provides the operator of harmony generator 10 an indication of how the harmony generator is set to operate. The display 80 is coupled to microprocessor 40 by a lead 82.

Figure 2:
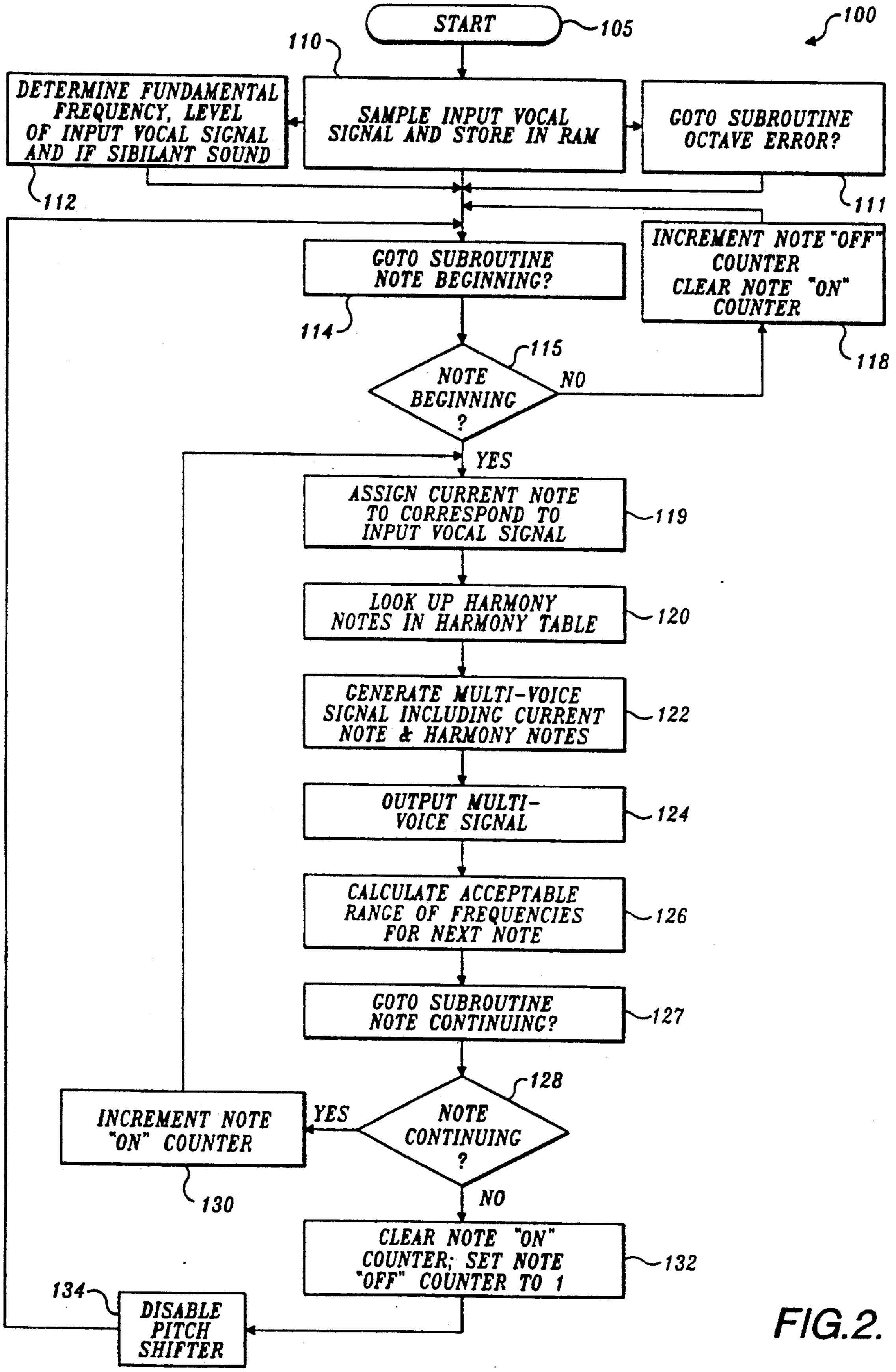
FIG. 2 is a flowchart illustrating the steps of a method for generating a multivoice signal according to the present invention.

FIG. 2 represents the logic used in a method, shown generally at 100, for analyzing the input vocal signal in order to generate the set of harmony signals that are combined with the input vocal signal to produce the multivoice signal according to the present invention. The method begins at a start block 105 and proceeds to block 110, wherein the input vocal signal is sampled and stored in the circular array (not shown) within RAM 44. Operating in parallel with and independently of block 110 are two subroutines shown in block 112 and block 111. Block 112 operates to determine an estimate of the fundamental frequency, the level of the input vocal signal, and if the input vocal signal is periodic. If the input signal is not periodic, block 112 returns an indication that the input vocal signal is nonperiodic as well as an indication of whether the input vocal signal is representative of a sibilant sound. Sibilant sounds are sounds like "sh," "ch," "s," etc. For the harmony signals to sound natural, the frequency of these types of sounds should not be shifted. Therefore, it is necessary to detect them and bypass the pitch-shifting algorithm, as will be described below. The operation of block 112 is described in commonly assigned U.S. Pat. No. 4,688,464, with the exception of the method of detecting sibilant sounds, which is described below. Briefly, block 112 searches for the fundamental frequency of the input vocal signal based upon the time the input vocal signal takes to cross a set of alternate positive and negative thresholds.

The block 111, which also operates in parallel with block 110, calls an octave error subroutine 400. As will be further described below, subroutine 400 determines if the fundamental frequency of the input vocal signal, which has been determined by block 112, is an octave lower than the actual fundamental frequency of the input vocal signal. While the Lent method works well for producing vocal harmonies, it is particularly sensitive to octave errors wherein a wrong determination is made regarding the octave of the note that the musician is singing. Therefore, additional checks are made to ensure that a correct octave determination has been made. Blocks 111 and 112 represent routines that continually run during the implementation of method 100.

After block 110, the method proceeds to block 114, which calls a subroutine 200. Subroutine 200 determines if the input vocal signal sampled in block 110 marks the beginning of a new note sung by the musician. The results of subroutine 200 are tested in decision block 115. If the answer to decision block 115 is no, meaning that a new note is not beginning, the method proceeds to block 118, where a note "off" counter is incremented and a note "on" counter is cleared. The note "off" counter keeps track of the length of time since the last note was sung into the harmony generator. Similarly, the note "on" counter keeps track of the length of time a current note has been sung by the musician. After block 118, the method loops back to block 114 until the answer from decision block 115 is yes. Once it is determined, by decision block 115, that a note is beginning, the method proceeds to block 119 wherein a variable, Current Note, is assigned to correspond to the input vocal signal. For example, if the input vocal signal had a fundamental frequency of approximately 440 Hertz, the method would assign the note, A, to the variable Current Note. The variable, Current Note, is then used as a reference for generating the harmony signals.

To assign which musical note is assigned to the variable, Current Note, a look-up table stored in the external ROM 40*b* coupled to the microprocessor 40 is used. Contained within the look-up table are the notes of an equal tempered scale stored as ranges of fundamental frequencies. Therefore, for any given input, there will correspond one note from the table that will be assigned to the variable Current Note. In the preferred embodiment, the range of frequencies that corresponds to a given note extends +/−50 cents (100's of a semitone) on either side of the fundamental frequency to allow for slight variations in the fundamental frequency of the input vocal signal when assigning the current note. For example, if the musician was singing flat, such that the input vocal signal has a fundamental frequency of 435 Hertz, the method would still assign the note, A, to the variable Current Note.

After block 119, the method proceeds to block 120, wherein the harmony notes that correspond to the variable Current Note are determined. In the preferred embodiment, block 120 comprises a look-up table stored in RAM 40*a* that contains the periods for each of the harmony notes that correspond to each possible Current Note period, as will be described. The following is the look-up table used by the present invention to generate the harmony signals.

| Current Note | Harmony 1 | Harmony 2 | Harmony 3 | Harmony 4 |
|---|---|---|---|---|
| C | E above | G above | A above | C above |
| C# | E above | G# above | A# above | C# below |
| D | F above | A above | B above | D below |
| D# | F# above | A# above | C above | D# below |
| E | G above | B above | C above | E below |
| F | A above | C above | D above | F below |
| F# | A# above | C# above | D# above | F# below |
| G | B above | D above | E above | G below |
| G# | C above | D# above | F above | G# below |
| A | C above | E above | G above | A below |
| A# | C# above | F above | G# above | A# below |
| B | D above | G above | A above | B below |

In the preferred embodiment, the above harmony table does not contain the words like "E above", etc., but rather contains the number of cents the harmony notes are away from the Current Note. For example, if the Current Note is C then RAM 44 contains +400 in the table for Harmony 1. (400 cents from C is 4 semitones or E above.) The harmony signals are generated by looking up the periods of the harmony notes that correspond to a given Current Note. For example, if the Current Note is F then, after determining the harmony notes are A above, C above, D above, and F below, the method then looks up the periods of each of the harmony notes. The periods of the harmonic signals are then used by a pair of pitch shifters to produce the multivoice signal, as will be described.

If the musician is singing either sharp or flat, it is possible to adjust the harmony notes to be correspondingly sharp or flat instead of adjusting them to harmonize with the nearest true pitch. For example, if the musician sings a Current Note of "E" on pitch, then the Harmony 1 note should be exactly G above E. However, if the musician is singing sharp, say +30 cents (i.e., 30/100's of a semitone), then the harmony note will be calculated as G above +30 cents (i.e., 30/100's of a semitone).

A second option used in selecting the harmony notes is a "No change option." With this option the harmony table is configured as follows:

| Current Note | Harmony 1 |
|---|---|
| C | E above |
| C# | n/c |
| D | G above |
| D# | n/c |
| E | C above |

As can be seen every other harmony note does not change. This allows the musician to add a certain amount of vibrato to the Current Note without the harmony notes varying widely. This hysteresis effect provides stability to the multivoice signal, which makes it sound more realistic.

By placing the harmony table in RAM 44, it is possible to allow the musician to program a variety of options for the particular types of harmonies generated, depending on the type of sound desired. (It should be noted that throughout this specification, the fundamental frequency of a note and its period are simply the inverse of each other, with one or the other of the terms being used for clarity where deemed appropriate.)

After determining the harmony notes that correspond to the Current Note, the method proceeds to block 122 wherein the multivoice signal including the Current Note and the harmony notes is generated. The operation of block 122 is described in further detail below. After block 122, the method proceeds to block 124 that outputs the multivoice signal.

After block 124, the method proceeds to block 126, wherein an acceptable range of frequencies for the next note is determined. In the preferred embodiment, once the variable Current Note is assigned to correspond to the fundamental frequency of the input vocal signal in block 119, the acceptable range of fundamental frequencies is initially set to be the fundamental frequency of the Current Note +/−25 percent. By assigning an acceptable range of frequencies for a next note, a more educated assignment can be made each time for the Current Note. This logic is based upon the assumption that a human voice is capable of changing notes only at a limited rate. Therefore, if the fundamental frequency as determined by the block 112 falls outside of the acceptable range of frequencies by +/−25 percent, the method assumes that the fundamental frequency reading from block 112 is in error.

After block 126, the method proceeds to block 127 that calls a subroutine 300, which determines if the Current Note is continuing to be sung by the musician or has ended. The operation of subroutine 300 is fully described below. Upon returning from subroutine 300, decision block 128 determines whether subroutine 300 found that the Current Note is continuing. If the answer to decision block 128 is yes, the method proceeds to block 130, which increments the note "on" counter. After block 130, the method loops back to block 119, which updates the Current Note, determines the harmony notes, and generates the multivoice signal, as previously described. If the answer to decision block 128 is no, the method proceeds to block 132, wherein the note "on" counter is cleared, and the note "off" counter is set to one. After block 132, the method proceeds to a block 134 in which a pair of pitch shifters (not shown) are disabled. After block 134, the method loops back to block 114 in order to begin looking for a new note in the input vocal signal. The method 100 continues looking for a new note to begin in the input vocal signal, assigning a value to the Current Note, determining the harmony notes, generating the multivoice signal, and calculating the acceptable range of frequencies for the next note, for as long as the musician continues singing.

Figure 3:
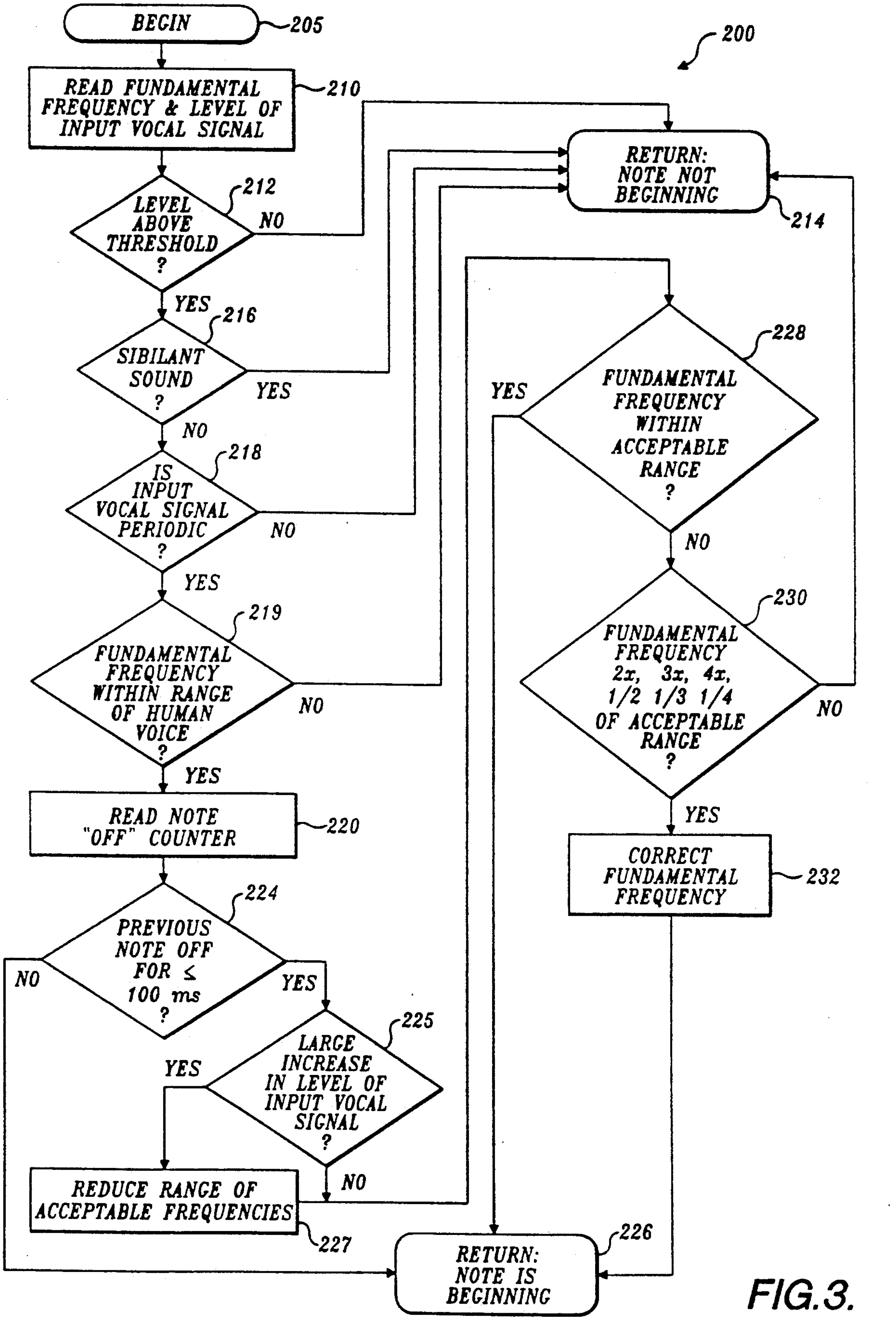
FIG. 3 is a flowchart showing the steps of a method for determining if a note is beginning.

FIG. 3 is a more detailed flowchart of the subroutine 200, which determines if the musician is singing a new note as shown in block 114 in FIG. 2. Subroutine 200 begins at block 205 and proceeds to block 210, wherein the fundamental frequency and level of the input vocal signal are read from block 112 (shown in FIG. 2). After block 210, the subroutine proceeds to decision block 212, which determines if tie level of the input vocal signal is above a predetermined threshold. The threshold value is preferably set by the musician to be greater than the level of background noise that enters the microphone 30 (shown in FIG. 1). If the level of the input vocal signal is not above the threshold, subroutine 200 proceeds to return block 214, which indicates that a new note is not beginning. If the level of the input vocal signal is above the predetermined threshold, subroutine 200 proceeds to decision block 216, which determines if the input vocal signal is representative of a sibilant sound. The operation of block 216 is more fully described below.

If the input vocal signal is not a sibilant sound, the subroutine proceeds to decision block 218, which determines if the input vocal signal is periodic. The answer to decision block 218 is also provided by the block 112 (shown in FIG. 2). If the input vocal signal is not periodic, the subroutine proceeds to return block 214, which indicates that a new note is not beginning. If the input signal is periodic, subroutine 200 proceeds to block 219 and determines if the fundamental frequency of the input vocal signal exceeds the range capable of being sung by a human voice. Specifically, if the fundamental frequency exceeds approximately 1000 Hertz, then the subroutine returns at block 214.

Having found that fundamental frequency is in the range of a human voice, subroutine 200 reads the note "off" counter. After block 220, subroutine 200 proceeds to decision block 224, which determines if the previous note has been "off" for less than or equal to 100 milliseconds. If the previous note did not end less than 100 milliseconds ago, subroutine 200 proceeds to return block 226, which indicates that a new note is being sung by the musician. If the answer to decision block 224 is yes, meaning that the previous note did end less than or equal to 100 milliseconds ago, the subroutine 200 proceeds to decision block 225. Decision block 225 determines if there has been a large increase in the level of the input vocal signal since the last time subroutine 200 was called. If the level of the input signal increases by 2, i.e., doubles, subroutine 200 proceeds to block 227, which reduces the range of acceptable frequencies as determined by block 126 in FIG. 2. In the preferred embodiment, the acceptable range is reduced from the fundamental frequency of the previous note, +/−25 percent, to the fundamental frequency of the previous note, +/−12.5 percent. The present method operates under the assumption that a large increase in the input vocal signal precedes a point at which it is difficult to determine the fundamental frequency. By reducing the range of acceptable frequencies, subroutine 200 avoids a "lock on" to a frequency that is not the fundamental frequency, but is instead a harmonic of the input vocal signal.

If the answer to decision block 225 is "no," or after reducing the acceptable range of frequencies in block 227, subroutine 200 proceeds to decision block 228, which determines if the fundamental frequency of the input signal is within the acceptable range (as calculated in block 126 of FIG. 2 or as reduced in block 227). If the answer to decision block 228 is "yes," subroutine 200 proceeds to return block 226, which indicates that a new note is beginning.

If the answer to decision block 228 is "no," meaning that the fundamental frequency is not within the acceptable range, subroutine 200 proceeds to decision block 230, which determines if integer multiples (2×, 3×, 4×) or fractions (½, ⅓, ¼) of the fundamental frequency are within the acceptable range. If the answer to decision block 230 is no, subroutine 200 proceeds to return block 214, which indicates that a new note is not beginning. If the answer to decision block 230 is "yes," meaning that an integer multiple or fraction of the fundamental frequency lies within the acceptable range, subroutine 200 proceeds to block 232, which divides or multiplies the fundamental frequency so that the result is within the acceptable range. For example, if the fundamental frequency is ⅓ of the expected frequency +/−25 percent, then the fundamental frequency is multiplied by 3, etc. After block 232, subroutine 200 proceeds to return block 226, which indicates that a new note is being sung by the musician.

Figure 4:
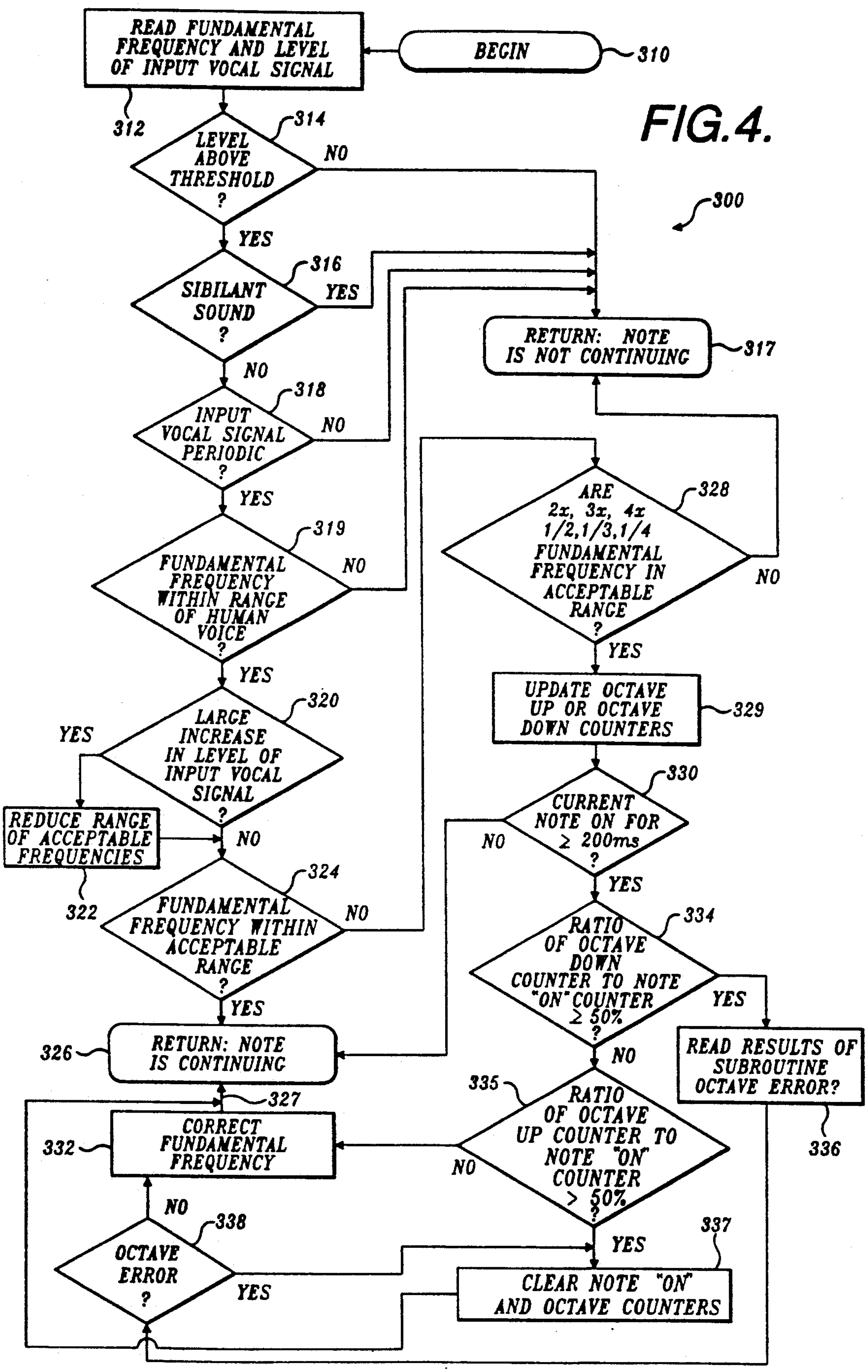
FIG. 4 is a flowchart showing the steps of a method for determining if a note is continuing.

FIG. 4 is a detailed flowchart of subroutine 300 called at block 127 (shown in FIG. 2). The purpose of subroutine 300 is to determine whether the Current Note being sung by the musician is continuing or whether it has ended. Subroutine 300 begins at block 310 and proceeds to block 312, which reads the fundamental frequency and level of the input vocal signal as determined by block 112 (shown in FIG. 2). After block 312, subroutine 300 proceeds to decision block 314, which determines if the level of the input signal exceeds the predetermined threshold. If the answer to block 314 is "no," the subroutine 300 proceeds to return block 317, which indicates that the Current Note is not continuing. If the level is above the threshold, subroutine 300 proceeds to decision block 316, which determines if the input vocal signal is representative of a sibilant sound. If the answer to decision block 316 is "yes," the subroutine 300 proceeds to return block 317. If the answer to decision block 316 is "no," subroutine 300 proceeds to decision block 318, which determines if the input vocal signal is periodic, by checking the results of block 112. If the answer to decision block 318 is "no," subroutine 300 proceeds to return block 317. If the answer to decision block 318 is "yes," subroutine 300 proceeds to decision block 319, which determines if the fundamental frequency of the input vocal sound is within the range of a human voice. Block 319 operates in the same way as block 219 (shown in FIG. 3). If the answer to decision block 319 is "no," subroutine 300 proceeds to return block 317. If the answer to decision block 319 is "yes," subroutine 300 proceeds to decision block 320.

Decision block 320 operates in the same way as block 225 (shown in FIG. 3) to determine if there is a large increase in the level of the input vocal signal. If the answer to block 320 is "yes," the range of acceptable frequencies is reduced in block 322. If either the answer to decision block 320 is "no" or, after the range of acceptable frequencies has been reduced in block 322, subroutine 300 proceeds to decision block 324 that determines if the fundamental frequency of the input signal is within the acceptable range, either as determined by block 126 (in FIG. 2) or as reduced in block 322, as just described. If the answer to decision block 324 is "yes," subroutine 300 proceeds to return block 326, which indicates that the note is continuing. If the answer to decision block 324 is no, meaning that the fundamental frequency is not within the acceptable range, subroutine 300 proceeds to decision block 328, which determines if integer multiples (2×, 3×, 4×) or fractions ($\frac{1}{2}$, $\frac{1}{3}$, $\frac{1}{4}$) of the fundamental frequency are within the acceptable range. If the answer to decision block 328 is "no," the subroutine 300 proceeds to return block 317, which indicates that the note is not continuing. If the answer to decision block 328 is "yes," subroutine 300 proceeds to block 329, which determines if there has been a jump in the octave of the input signal. An "octave up" jump is detected by a doubling of the fundamental frequency, while an "octave down" jump is detected by a halving of the fundamental frequency. A pair of variables, Octave Up and Octave Down, keeps track of the number of times the input vocal signal jumps an octave up and down, respectively. These variables are updated in the block 329, before the subroutine. proceeds to decision block 330.

The present method of analyzing input vocal signals operates by keeping track of the number of times the fundamental frequency determined by block 112 jumps an octave. For example, if the musician begins to sing a word that begins with a "W" at A-440 Hertz, the fundamental frequency may begin at A-220 Hertz, jump to A-440 Hertz, back to A-220 Hertz, up to A-880 Hertz, etc. The two variables, Octave Up and Octave Down, keep track of the number of times the fundamental frequency jumps an octave from A-440 Hertz. Because the present method has no way of knowing which of the octaves A-220 Hertz, A-440 Hertz, or A-880 Hertz is the correct frequency being sung by the musician, an initial estimate is made. The initial estimate is assumed to be correct but is allowed to change either up or down for the first six times through subroutine 300. After the note has been "on" for between 100–200 milliseconds, it is necessary for the method to "lock on" or choose one of the octaves. However, after about 200 milliseconds, if the ratio of the number of times the fundamental frequency drops an octave, as compared to the length of time the note has been on, exceeds 50 percent, then the method needs to determine whether an octave error has been made and, thus, that the wrong choice for the octave was made initially.

Decision block 330 determines if the current note has been on for a time greater than or equal to 200 milliseconds, as determined by the note "on" counter. If the answer to decision block 330 is "no," then subroutine 300 proceeds to return block 326, which indicates that the Current Note is continuing. Upon returning to block 119 (shown in FIG. 2), the variable Current Note is updated to reflect the new fundamental frequency. If the answer to decision block 330 is yes, subroutine 300 proceeds to decision block 334, which determines a ratio of the count in the Octave Down counter to the time the current note has been on. If this ratio exceeds 50%, subroutine 300 proceeds to block 336, which reads the results of the octave error subroutine 400 as shown in FIG. 2.

If the answer to decision block 334 is no, subroutine 300 proceeds to block 335 which calculates a ratio of the count in the Octave Up counter to the time Current Note has been on. If this ratio does not exceed 50%, then subroutine 300 proceeds to block 332, which corrects the fundamental frequency. For example, if the six readings had indicated that the fundamental frequency was 440 Hertz and then the fundamental frequency was determined to be 880 Hz, the ratio of the Octave Up counter to the note "on" counter would not exceed 50% and the 880 Hertz reading would be divided by two. After block 332 the subroutine proceeds to return block 326. If the answer to decision block 335 is "yes," then it is assumed that the fundamental frequency is the correct fundamental frequency and an error was made initially when the Current Note was assigned a value. Therefore, the subroutine 300 proceeds to block 337 that clears the note "on" and octave counters before proceeding to return block 326. Upon returning, the Current Note will be updated to reflect the new higher octave.

If the answer to decision block 334 is "yes," then subroutine 300 proceeds to block 336, which reads the result of the octave error subroutine. The results of the octave error subroutine are tested in decision block 338. If there is not an octave error (i.e., initial estimate of the octave of the input vocal signal was correct) then the fundamental frequency just determined is an octave lower than the actual fundamental frequency of the input vocal signal. Therefore, the frequency is multiplied by two in block 332. If there is an octave error, then it is assumed that the fundamental frequency just determined is the correct fundamental frequency and the subroutine proceeds to return block 326 and the initial estimate of the octave that the musician was singing was incorrect. Therefore, the note "on" counter and octave counters are cleared in block 337 before returning to block 326 so that the new fundamental frequency will now be assigned to the current note.

Figure 5:
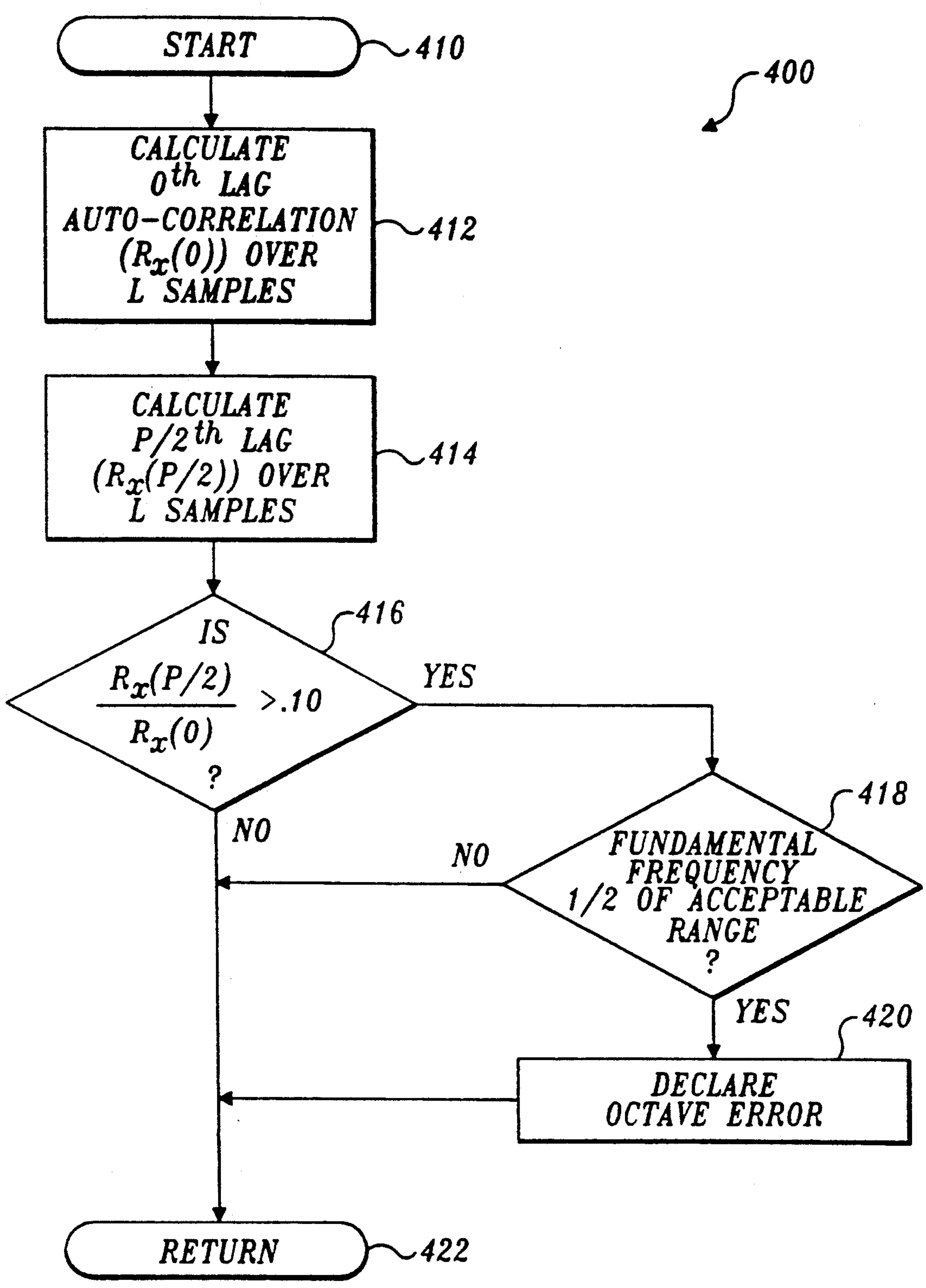
FIG. 5 is a flowchart for detecting octave errors used in the method according to the present invention.

FIG. 5 is a detailed flowchart showing the operation of the octave error subroutine 400 (referenced in FIG. 2). Subroutine 400 begins at start block 410 and proceeds to block 412, which calculates the 0th lag autocorrelation ($R_x(0)$) of the input vocal signal for a period of L samples. In the preferred embodiment, L is set equal to 256. The 0th lag autocorrelation is determined using the formula given in Equation 1:

$$R_x(0) = \sum_{n=0}^{L-1} x(n) \cdot x(n) \quad (1)$$

where x(n) is the input vocal signal stored in RAM 44 (shown in FIG. 1).

After block 412, subroutine 400 proceeds to block 414 wherein the P/2th lag autocorrelation ($R_x(P/2)$) is calculated according to Equation 2:

$$R_x(P/2) = \sum_{n=0}^{L-1} x(n) \cdot x(n - P/2) \quad (2)$$

Wherein P is the period of the fundamental frequency of the input vocal signal. If the ratio of the 0th autocorrelation to the P/2th lag autocorrelation exceeds 0.10 as determined by a decision block 416, subroutine 400 proceeds to decision block 418 that determines if the fundamental frequency is half of the acceptable range, i.e., an octave lower than expected. If the answer to decision block 418 is yes, subroutine 400 proceeds to block 420, which declares an octave error. If the answer to either decision blocks 416 or 418 is no, subroutine 400 proceeds directly to return block 422. Subroutine 400, in effect, compares the magnitude of the fundamental frequency of the input vocal signal to the magnitude of the even harmonics. Because an octave error is typically indicated by a large value of the even harmonics, as compared to the fundamental frequency, the ratiometric determination can be made, and the initial estimate of fundamental frequency then corrected to reflect the actual fundamental frequency of the input vocal signal.

Figure 6:
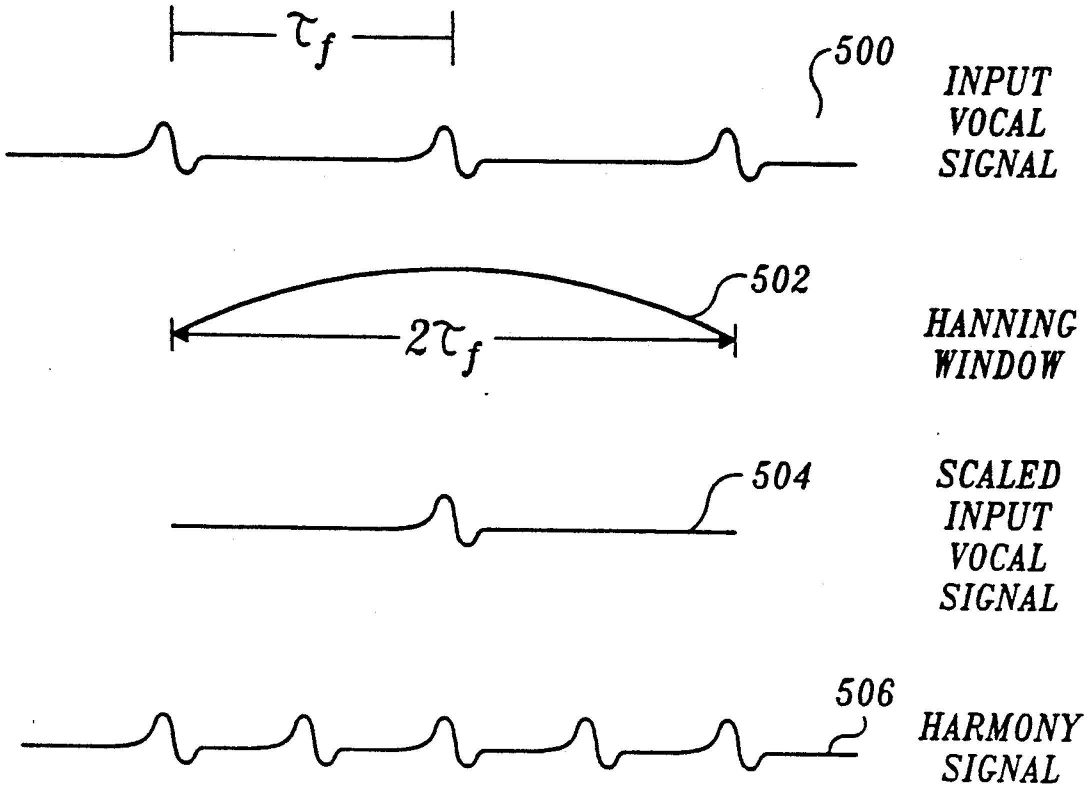
FIG. 6 is a diagram showing how a harmony signal is produced.

FIG. 6 is a diagram showing how the method of the present invention operates to generate the harmony signals. The input vocal signal 500 is shown having a period $\tau_f$. A portion of the input vocal signal is extracted by multiplying the signal by a window 502 having a duration preferably equal to twice the period $\tau_f$ of the fundamental frequency. In the preferred embodiment, the window is shaped to be an approximation of a Hanning window in order to reduce high-frequency noise in the final multivoice signal. However, many smoothly varying functions may be employed. The result of multiplying the input vocal signal 500 by the window 502 is shown as a scaled input vocal signal 504. As can be seen, the scaled input vocal signal is substantially zero everywhere except under the bell-shaped portion of window 502. Therefore, what has been extracted from input vocal signal 500 is a portion having a duration of twice the period $\tau_f$.

A harmony signal 506 is produced by replicating the scaled input vocal signal 504 at a rate of twice the fundamental frequency of input signal 500 to create a harmony signal that is an octave above the input vocal signal 500. To create a harmony signal an octave lower than input vocal signal 500, the scaled input vocal signal 504 would be replicated at a rate of one-half the fundamental frequency of the input signal. Therefore, by adjusting the rate at which the scaled input signal 504 is replicated, any harmony note can be produced without altering the shape of the spectral envelope of the input vocal signal 500, as discussed above.

Figure 7:
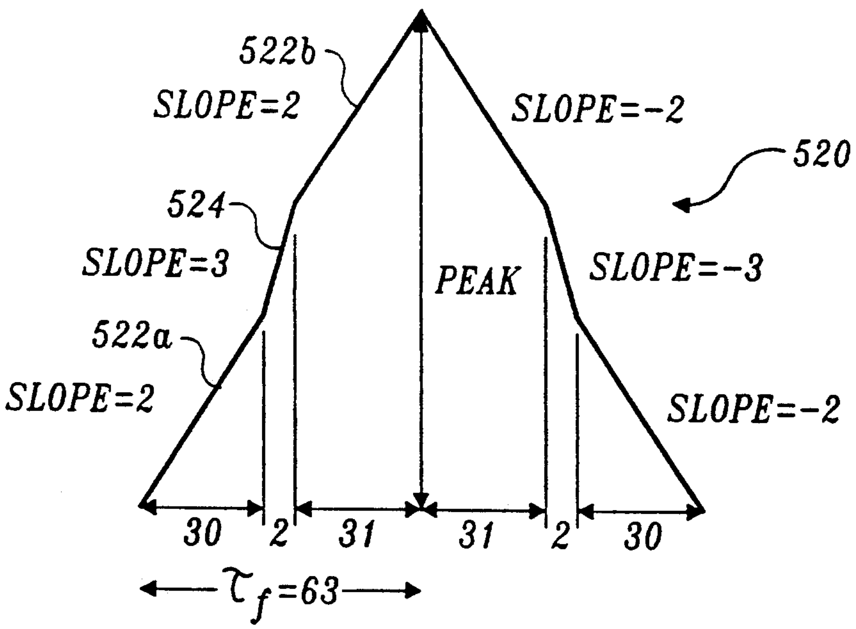
FIG. 7 shows the steps used to generate a piecewise linear approximation of a Hanning window according to the present invention.

Because a Hanning window 502 shown in FIG. 6 is computationally difficult to compute in real time with a simple microprocessor, the present method approximates a Hanning window using a piecewise linear approximation. FIG. 7 shows how the approximation of the window function 520 is computed. For purposes of illustration, it is assumed that the period $\tau_f$ of the fundamental frequency of the input vocal signal is 63. This number is obtained from the block 112 shown in FIG. 2, as described earlier. The piecewise linear approximation is generated using two lines 522 and 524, each having a different slope and a different duration. The line 522 is broken into two segments 522a and 522b, with the second line 524 disposed between them. The slope of line 522 is designated as $Slope_1$ while the slope of line 524 is designated as $Slope_2$. The calculations of the slopes and durations are given by Equations 3–6:

$$Slope_1 = Int(Peak/\tau_f) \quad (3)$$

$$Slope_2 = Slope_1 + 1 \quad (4)$$

$$\text{duration of } Slope_2 = Peak - (\tau_f slope_1) \quad (5)$$

$$\text{duration of } Slope_1 = \tau_f - \text{duration of } Slope_1 \quad (6)$$

The variable Peak is a predefined variable and in the preferred embodiment equals 128. Applying these equations to the piecewise linear approximation 520 (shown in FIG. 7) results in the slope of 2 for line 522 and a slope of 3 for line 524. The duration of the segment 522a is 30, the duration of segment 522b is 31, and the duration of line 524 is 2. Any odd durations are always added to line 522b. The second half of the piecewise linear approximation 520 is made by providing a mirror image of the left half, having the same durations, but with negative slopes. By using only slopes having integer values, the multiplication operations needed to extract a portion of the waveforms are simpler and, thus, enable the present method to operate substantially in real time, with an inexpensive microprocessor. Furthermore, noninteger slope values would introduce unwanted high-frequency modulations to the multivoice signal.

Figure 8:
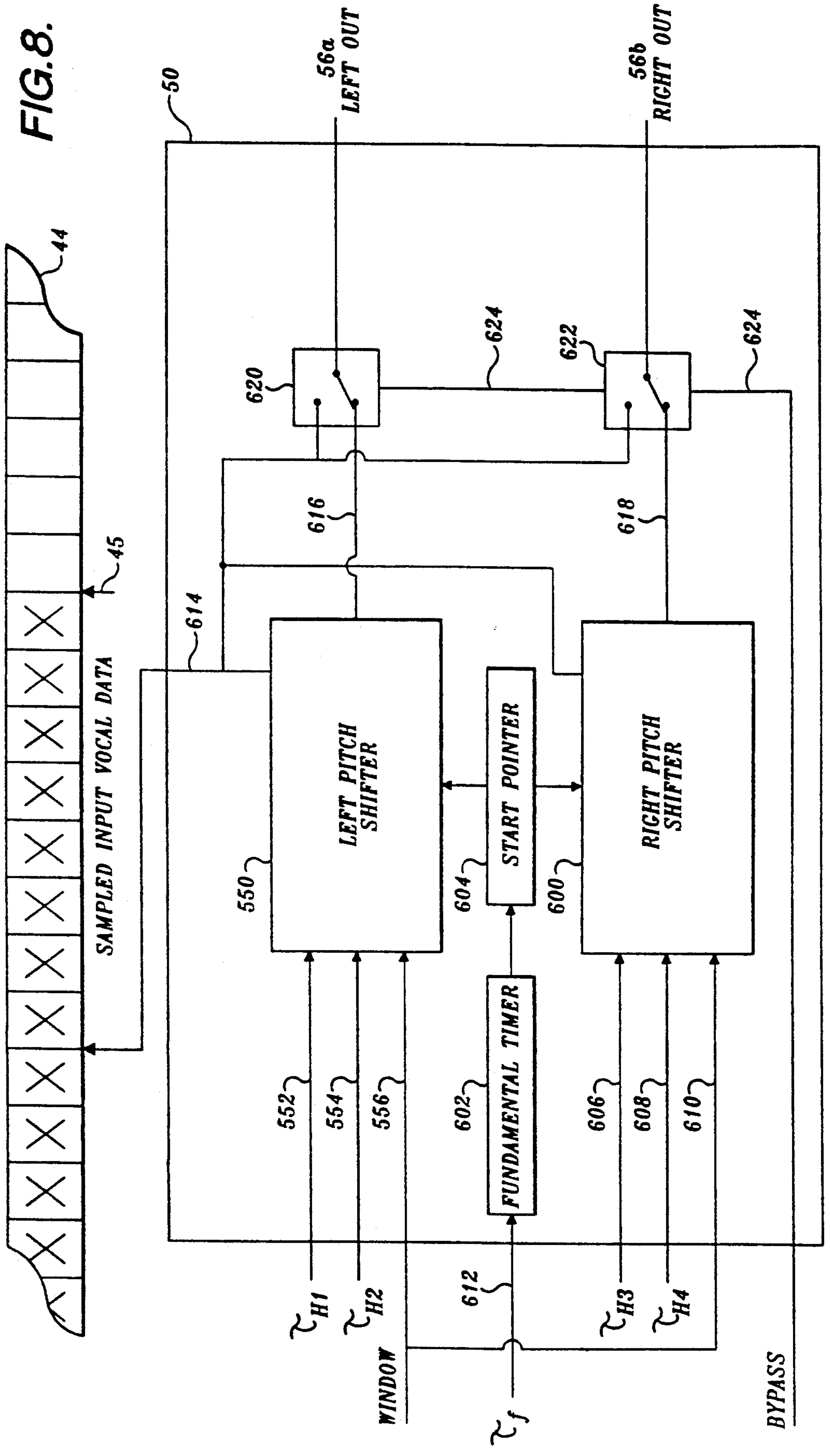
FIG. 8 is a block diagram of a signal-processing chip according to the present invention.

FIG. 8 shows a block diagram of the signal processor block 50 as (shown in FIG. 1). Signal processor block 50 generates the multivoice output signal, which comprises the input vocal signal and the plurality of harmony signals. A left pitch shifter 550 and a right pitch shifter 600 replicate the scaled input vocal signals at a plurality of rates equal to the frequencies of each of the harmony signals as determined above. The left pitch shifter 550 receives the period of the first and second harmony signals on leads 552 and 554, respectively. Also applied to the left pitch shifter 550 on lead 556 is a description of the piecewise linear approximation of the Hanning window. Similarly, the right pitch shifter 600 receives the period of the third and fourth harmony signals on leads 606 and 608, respectively, as well as the description of the Hanning window, on lead 610. The period of the fundamental frequency, $\tau_f$, is applied to a fundamental timer 602 on lead 612. The fundamental timer 602 is set to time a predetermined interval by loading it with an appropriate number. By loading the fundamental timer 602 with the period $\tau_f$ of the fundamental frequency of the input vocal signal, the fundamental timer 602 times an interval having the same duration as the fundamental frequency of the input signal. Each time the fundamental timer times its interval, a start pointer 604 is loaded with the address in RAM 44 from where the portion of the input vocal signal is to be retrieved.

As described above, RAM 44 is configured as a circular array in which the input vocal data are stored. A write pointer 45 is always updated to indicate the next available location in memory in which input vocal data can be stored. The present method assumes that the pitch detection subroutine 112 (shown in FIG. 2) takes about 20 milliseconds to complete its determination of the fundamental frequency of the input signal. Therefore, the start of the portion of the input vocal signal to be retrieved can be determined by subtracting the amount of data sampled in 20 milliseconds from the address of the write pointer 45. The fundamental timer 602 and the start pointer 604 thus operate together to determine the address in RAM 44 of the portion of the input vocal signal to be extracted.

The left pitch shifter 550 and the right pitch shifter 600 multiply the input vocal data stored in RAM 44 by the window function. Each pitch shifter 550, 600 receives the sampled input vocal data on lead 614 and outputs the result on leads 616 and 618, respectively. A pair of switches 620, 622 connect the output of signal processor block 50 to a pair of leads 56a and 56b. The switches 620 and 622 are controlled by a bypass signal transmitted on lead 624 from the microprocessor. If a note is not detected (due to sibilance, low level, etc.), leads 56a and 56b receive the sampled input vocal data from lead 614 directly, and the pitch shifters 550 and 600 are bypassed. As stated above, in order to make the multivoice signal sound natural, the frequency of sibilant sounds should not be shifted.

Figure 9:
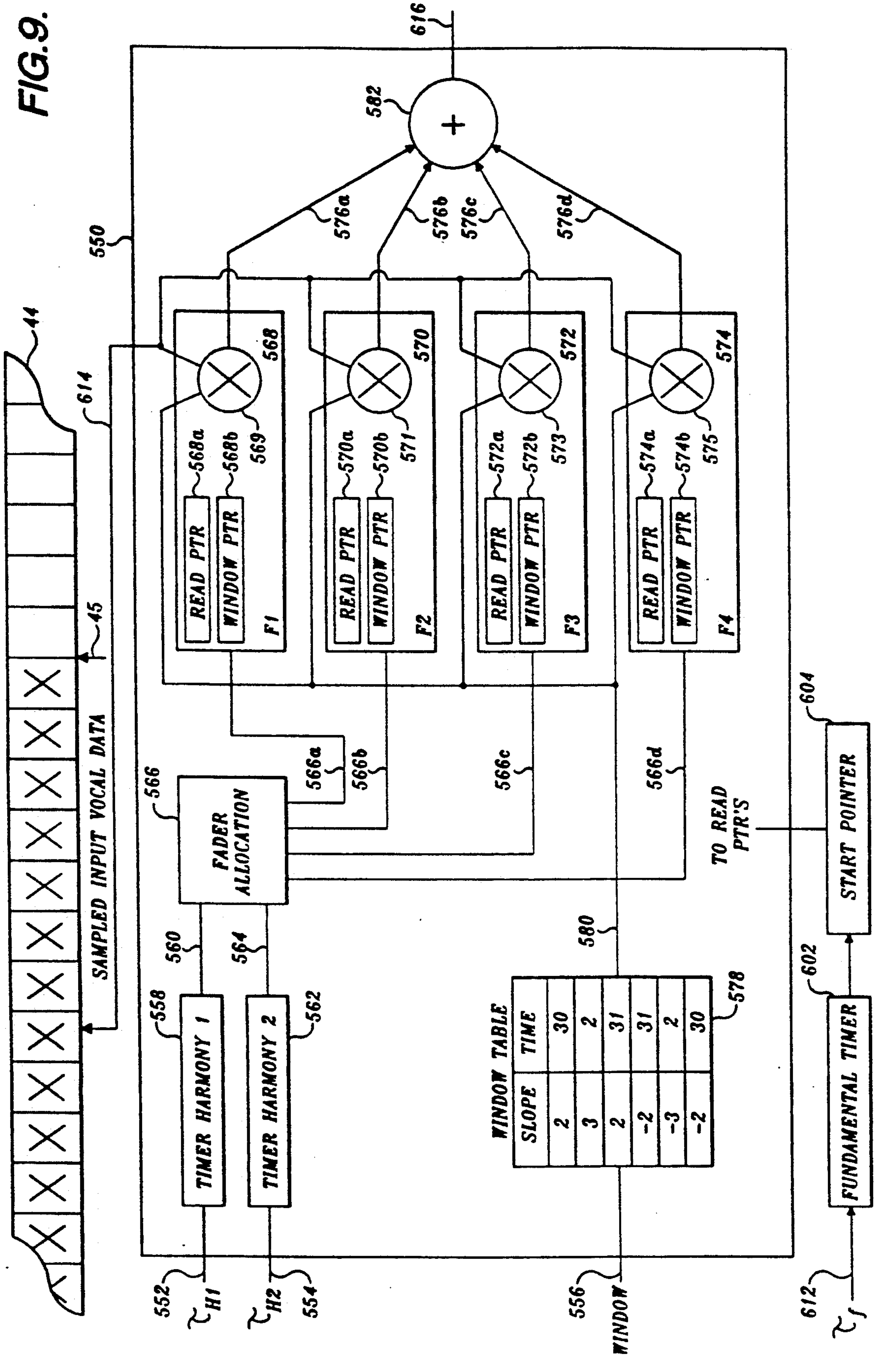
FIG. 9 is a block diagram of a pitch shifter included within the signal-processing chip.

FIG. 9 shows a detailed block diagram of the left pitch shifter 550, as shown in FIG. 8. As stated above, the pitch shifter 550 multiplies a portion of the sampled input vocal data by the window function at a plurality of rates to produce the harmony signals. Included within left pitch shifter 550 are two timers 558 and 562, which are loaded with the periods of the first and second harmony signals, respectively. The timers 558 and 562 time an interval equal to the period of the first and second harmony signals. As the timer 558 times an interval equal to the period of the first harmony signal, $\tau_{h1}$, a signal is sent on lead 562 to fader allocation block 566. Similarly, as timer 562 times an interval equal to the period of the second harmony signal, $\tau_{h2}$, a signal is sent on lead 564 to fader allocation block 566. The fader allocation block 566 triggers one of four faders 568, 570, 572, and 574 to begin generating a portion of the multivoice signal by multiplying the sampled input vocal data by the window function. The fader allocation block 566 is coupled to the faders by a set of leads 566a, 566b, 566c, and 566d.

Included within each of the faders 568a, 570a, 572a, and 574a, respectively, is a read pointer and a window pointer 568b, 570b, 572b, and 574b. Each time a fader is requested, the current start pointer 604 is loaded into the read pointer of the triggered fader to indicate the address in RAM 44 from where the input vocal data is to be read. Also included in each of the faders 568, 570, 572, and 574 is a window pointer to keep track of the part of the piecewise linear approximation of the window function that is to be multiplied by the input vocal data. Left pitch shifter 550 also includes a window table 578 that contains a mathematical description of the piecewise linear approximation of the window. Window table 578 is coupled to each of the faders by lead 580. Each fader included within the pitch shifter operates in the same manner. Therefore, the following description of fader 568 applies equally to the other faders.

If the first harmony signal is selected to be at an octave below the input vocal signal, the period $\tau_{h1}$ would be equal to twice the period $\tau_f$. As timer 558 reaches the value $\tau_{h1}$, fader allocation block 566 selects an available fader to begin multiplying the sampled input vocal data by the window function. Assuming that fader 568 is available, the read pointer included within fader 568 is updated to equal the address in RAM 44 from where the data is to be read. Fader 568 then begins multiplying the sampled input vocal data received on lead 614 by the window function obtained from lead 580 in multiplication block 569. The results of the multiplication are output on lead 576a to summer 582, where the result is combined with the outputs of the other faders to provide a signal on lead 616 equal to the output of the left pitch shifter.

Because the window function is chosen to have a duration equal to twice the fundamental frequency of the input vocal signal, two faders are required to produce a signal having a frequency equal to the frequency of the input vocal signal. Only one fader is required to produce a harmony signal an octave lower than the input vocal signal, while four faders are required to produce a harmony signal having a frequency twice that of the input vocal signal. It is possible to alter the window function to have a duration less than two periods of the input vocal signal in order to reduce the number of faders required, however, such a reduction in the window duration results in a corresponding decrease in audio quality. The operation of multiplying a Hanning window by a signal to create harmonies of the signal is fully described in the Lent paper referenced above and, thus, known in the art.

Figure 10:
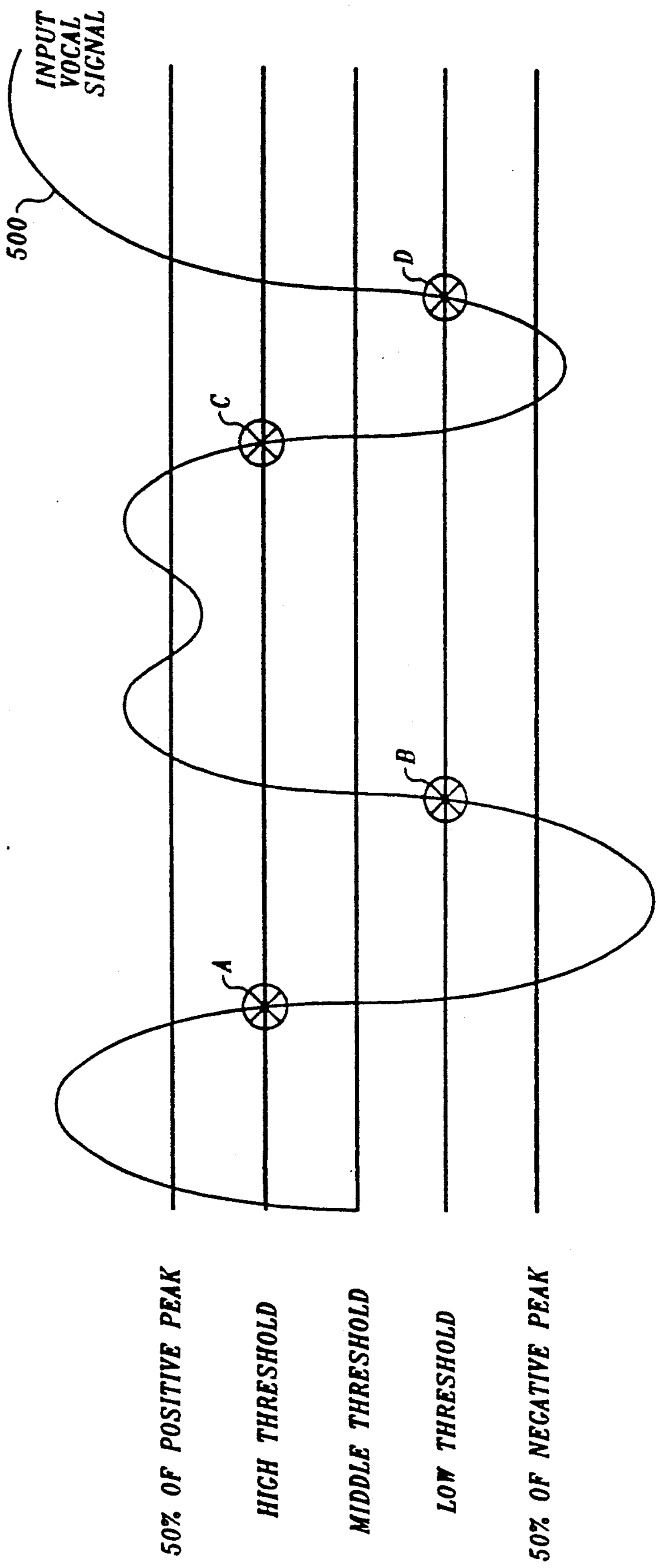
FIG. 10 is a graph of an input signal that is representative of a sibilant sound.

FIG. 10 shows a graph of an input vocal signal 500 crossing a series of predefined thresholds used by subroutine 112 to detect a sibilant sound. As stated above, sibilant sounds are detected by large-amplitude, high-frequency variations. The method of pitch detection disclosed in U.S. Pat. No. 4,688,464 is altered in the present invention. Two thresholds at 50 percent of the positive peak value and 50 percent of the negative peak value are determined. The prior method is also altered so that a record is made each time the input vocal signal completes the following sequence: crossing the high threshold, the threshold at 50 percent of the peak value, and recrossing the high threshold. In FIG. 10, this sequence is shown completed at points A and C. Similarly, the method also records each time the input vocal signal completes the sequence of crossing the low threshold, the threshold at 50 percent of the negative peak, and recrossing the low threshold. Completions of this sequence are shown as points B and D. If more than 16 to 160 of these occurrences occurs in less than 8 milliseconds, the method assumes that a sibilant sound has been detected, so that the bypass line to each of the pitch shifters is enabled, thereby bypassing the pitch shifters as described above. In the preferred embodiment, the number of sequences required to signal a sibilant sound is adjustable by the musician.

Although the present invention has been disclosed with respect to its preferred embodiments, those skilled in the art will realize that changes to the preferred embodiments may be made in form and substance without departing from the spirit and scope of the invention. Therefore, it is intended that the scope be limited only by the following claims.

The embodiments of the invention in which an exclusive property or privilege is claimed are defined as follows:

1. Apparatus for analyzing an input signal representative of a vocal note and for producing a plurality of harmony signals that are combined with the input signal signal to produce a multivoice output, comprising:
   - an analog-to-digital converter for sampling the input signal;
   - a digital memory, coupled to the analog-to-digital converter, in which the sampled input signal is stored;
   - computing means coupled to the digital memory for analyzing the stored input signal to determine a fundamental frequency of the input signal;
   - means for generating one or more harmony signals, having a predefined musical relationship to the vocal note in response to the fundamental frequency of the input signal; and a mixer for combining the one or more harmony signals with the input signal to produce the multivoice output.

2. The apparatus of claim 1, wherein the means for generating the one or more harmony signals comprises:

means for selecting one or more fundamental harmony frequencies in response to the fundamental frequency of the input signal, wherein the one or more fundamental harmony frequencies define one or more harmony notes that have a musical relationship to the vocal note;

means for extracting a portion of the stored input signal; and means for replicating the extracted portion at a plurality of rates that are a function of the fundamental harmony frequency of each of the one or more harmony notes.

3. The apparatus of claim 2, wherein the means of extracting a portion of the stored input signal scales the stored input signal with a window function.

4. The apparatus of claim 2, wherein the means for extracting a portion of the stored input signal comprises:

means for computing a piecewise linear approximation of a Hanning window having a duration greater than a period of the fundamental frequency of the input signal and means for scaling the stored input signal with the piecewise linear approximation of the Hanning window.

5. Apparatus for analyzing an input signal that is representative of a vocal note and for producing one or more harmony signals that are harmonically related to the vocal note, comprising:

an analog-to-digital converter that samples the input signal;

a digital memory coupled to the analog-to-digital converter, for storing the sampled input signal;

a microprocessor coupled to the digital memory, for analyzing the stored input signal to determine a fundamental frequency of the input signal, for selecting one or more harmony signals to be produced in response to the fundamental frequency of the input signal and for determining a fundamental frequency of the selected one or more harmony signals; and one or more pitch shifters, coupled to the microprocessor, that produce the one or more harmony signals by extracting a portion of the stored input signal, replicating the extracted portion of the stored input signal at a rate that is a function of the fundamental frequencies of the selected one or more harmony signals and summing the replicated portions such that there are substantially no discontinuities in the one or more harmony signals.

6. The apparatus of claim 5, wherein the one or more pitch shifters that extract a portion of the stored input signal and replicate the extracted portion comprise:

one or more faders that scale the stored input signal by a window function at a periodic time interval that is related to the fundamental frequency of the one or more harmony signals.

7. The apparatus of claim 6, wherein the window function is a piecewise linear approximation of a Hanning window.

8. The apparatus of claim 5, wherein the one or more pitch shifters comprise:

one or more faders that extract a portion of the stored input signal by scaling the stored input signal by a window function; and one or more timers that cause the one or more faders to begin scaling the stored input signal by the window function at a time interval that is a function of the fundamental frequencies of the one or more harmony signals.

9. The apparatus of claim 5, further comprising a mixer for combining the input signal with the one or more harmony signals to produce a multivoice signal.

10. A method for analyzing an input vocal signal and for generating one or more harmony signals that have a predefined musical relationship to the input vocal signal, comprising the steps of:

sampling the input vocal signal to create a digital representation of the input vocal signal;

analyzing the digital representation of the input vocal signal to determine a fundamental frequency of the input vocal signal;

selecting one or more fundamental frequencies that define one or more harmony signals based upon the fundamental frequency of the input vocal signal;

extracting a portion of the digital representation of the input vocal signal; and replicating the extracted portion of the digital representation of the input vocal signal at one or more rates that are a function of the fundamental frequencies that define the one or more harmony signals.

11. A method for producing one or more harmony signals for use with an input vocal signal to produce a multivoice output, comprising the steps of:

analyzing the input vocal signal to determine a fundamental frequency of the input vocal signal;

producing one or more harmony signals, which are musically related to the input vocal signal, based on the fundamental frequency of the input vocal signal; and producing the multivoice output using the one or more harmony signals and the input vocal signal.

12. The method of claim 11, wherein the step of producing the one or more harmony signals comprises the steps of:

sampling the input vocal signal;

storing the input vocal input; and replicating a portion of the stored input vocal signal at a rate that is a function of a fundamental frequency of each of the one or more harmony signals.

* * * * *

UNITED STATES PATENT AND TRADEMARK OFFICE
CERTIFICATE OF CORRECTION

PATENT NO. : 5,301,259

DATED : April 5, 1994

INVENTOR(S) : B. C. Gibson et al.

It is certified that error appears in the above-indentified patent and that said Letters Patent is hereby corrected as shown below:

| COLUMN | LINE | |
|---|---|---|
| 5 | 38 | "C above" should read --C below-- |
| 14 (Claim 1, | 58 Line 4) | delete "signal" |

Signed and Sealed this

Twenty-sixth Day of July, 1994

Attest:

BRUCE LEHMAN

Attesting Officer

Commissioner of Patents and Trademarks